United States Patent [19]
Shen

[11] Patent Number: 5,174,138
[45] Date of Patent: Dec. 29, 1992

[54] STEERING WHEEL LOCK

[76] Inventor: Alice Shen, 68-1, Hsien-Jen Rd., Ta-Chia Chen, Tai-Chung Hsien, Taiwan

[21] Appl. No.: 739,514

[22] Filed: Aug. 2, 1991

[51] Int. Cl.⁵ .............................. B60K 25/02
[52] U.S. Cl. .................... 70/209; 70/360; 70/226
[58] Field of Search ............ 70/209, 211–213, 70/225–226, 237, 360

[56] References Cited

U.S. PATENT DOCUMENTS

| | | | |
|---|---|---|---|
| 1,951,418 | 3/1934 | Jacobi | 70/360 |
| 2,032,821 | 3/1936 | Waits | 70/360 |
| 4,825,671 | 5/1989 | Wu | 70/211 |
| 5,014,529 | 5/1991 | Wu | 70/226 |
| 5,031,428 | 7/1991 | Jan et al. | 70/209 |
| 5,040,388 | 8/1991 | Chen | 70/226 |
| 5,092,146 | 3/1992 | Wang | 70/226 |

FOREIGN PATENT DOCUMENTS

| | | | |
|---|---|---|---|
| 2639591 | 6/1990 | France | 70/237 |
| 1127524 | 9/1968 | United Kingdom | 70/226 |
| 2039840 | 8/1980 | United Kingdom | 70/209 |

Primary Examiner—Renee S. Luebke
Assistant Examiner—Darnell M. Boucher
Attorney, Agent, or Firm—Alfred Lei

[57] ABSTRACT

This invention relates to a steering wheel lock and in particular to one including a square tubular member having a seat formed with a groove and a hole in the inner side, a movable cylinder slidably inserted into the square tubular member and having a plurality of holes, a rod member slidably inserted into the movable cylinder and a having a plurality of annular grooves, and a lock core composed of a central block, a rotatable member, an engaging pin, a fixing pin and a spring, whereby the lock may be easily assembled and contracted in two stages when not in use.

1 Claim, 6 Drawing Sheets

STEERING WHEEL LOCK

BACKGROUND OF THE INVENTION

It is found that the lock core 9 (see FIGS. 1 and 2) of prior art steering wheel lock has the following drawbacks:
1. The protuberance 98 must be associated with a spring 91 and a confining cover 92 thus increasing the number of component parts and therefore enhancing the cost. Further, it is necessary to mount the confining cover 92, the spring 91 and the core 90 into the seat 8 in order thus increasing the time required for assemble the lock.
2. Since the engagement between the confining cover 92 and the annular groove 70 of the movable rod member 7 is maintained by the resilient force of the spring 91 against the bottom of the core 90, so when the movable rod member 7 is pulled by a relatively large force, it is liable that the confining cover 92 will apply a reverse force thus separating the movable rod member 7 from the lock core 9.

It is, therefore, an object of the present invention to provide a steering wheel lock which may obviate and mitigate the above-mentioned drawbacks.

SUMMARY OF THE INVENTION

This invention relates to an improved steering wheel lock.

It is the primary object of the present invention to provide a steering wheel lock which is simple in construction.

It is another object of the present invention to provide a steering wheel lock which is economic to produce.

It is still another object of the present invention to provide a steering wheel lock which is fit for various kinds of vehicles.

It is still another object of the present invention to provide a steering wheel lock which is easy to operate.

It is a further object of the present invention to provide a steering wheel lock which may be contracted in two stages when not in use.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
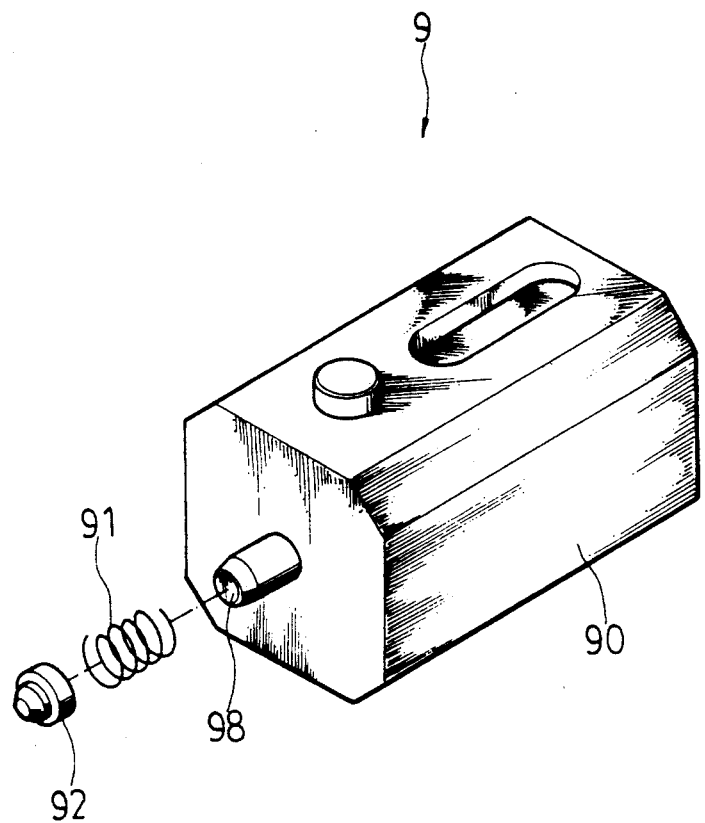
FIG. 1 is a perspective view of a core for a prior art steering wheel lock.
Figure 2:
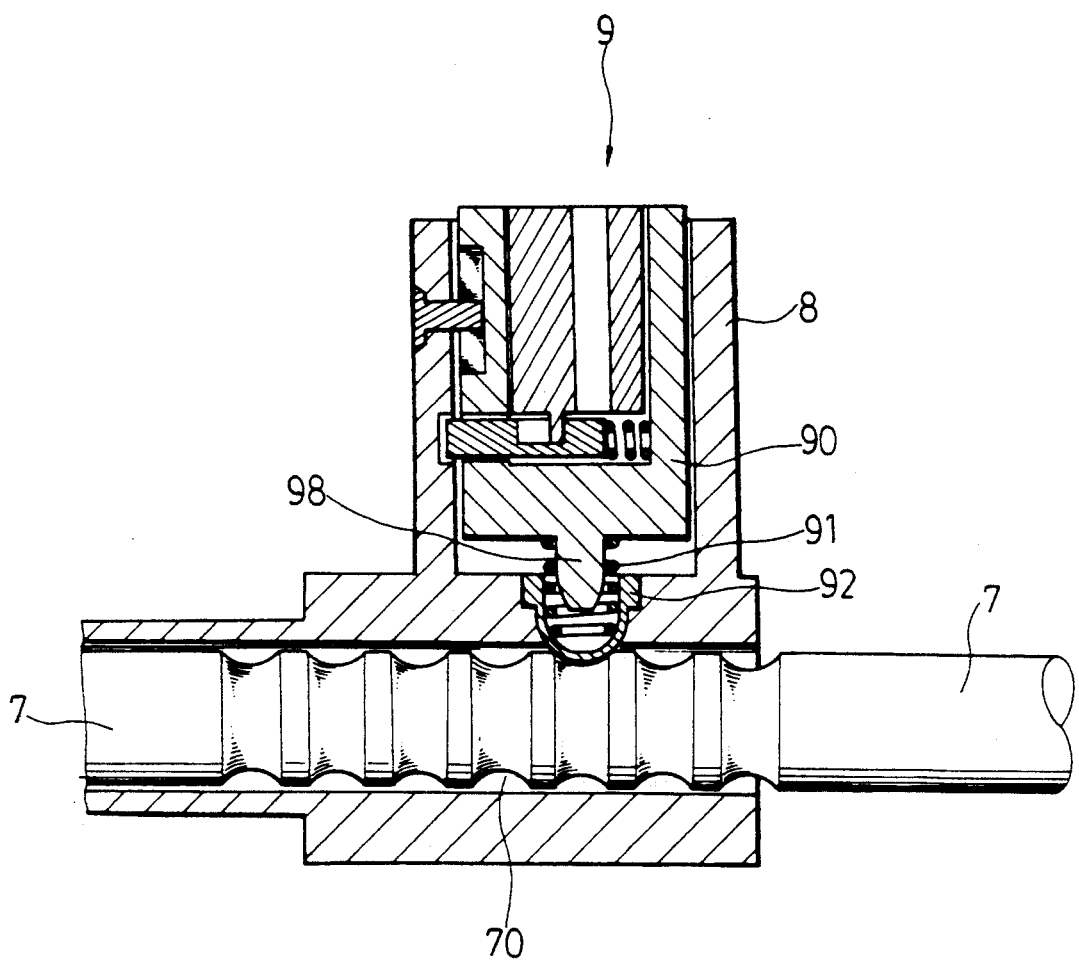
FIG. 2 is a sectional view showing the core of a prior art steering wheel lock.
Figure 3:
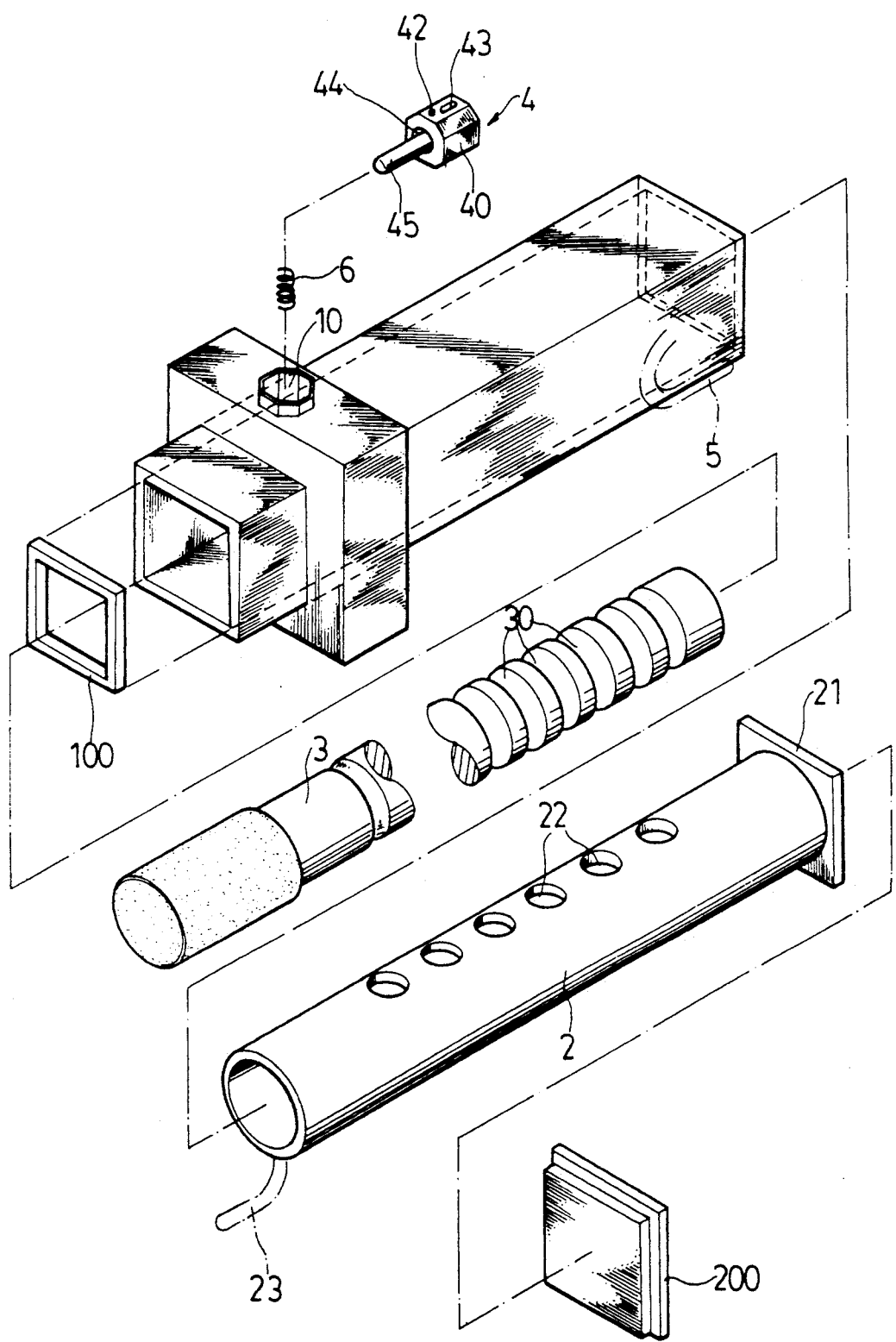
FIG. 3 is an exploded view of a steering wheel lock according to the present invention.
Figure 4:
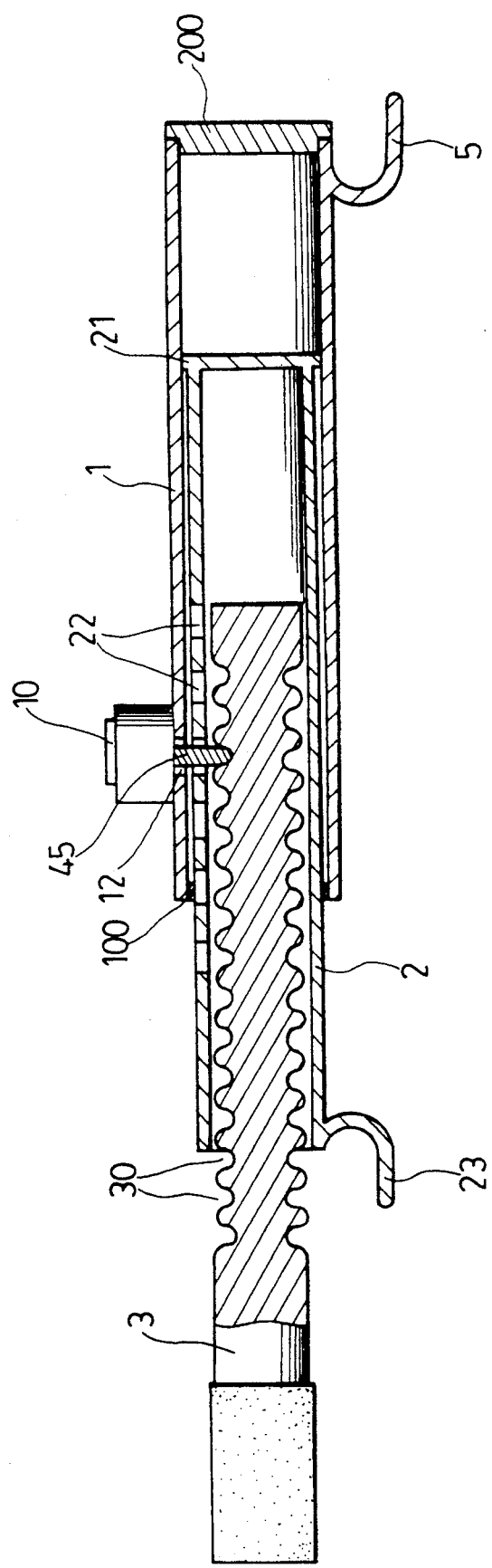
FIG. 4 is a sectional view of the steering wheel lock according to the present invention.
Figure 5:
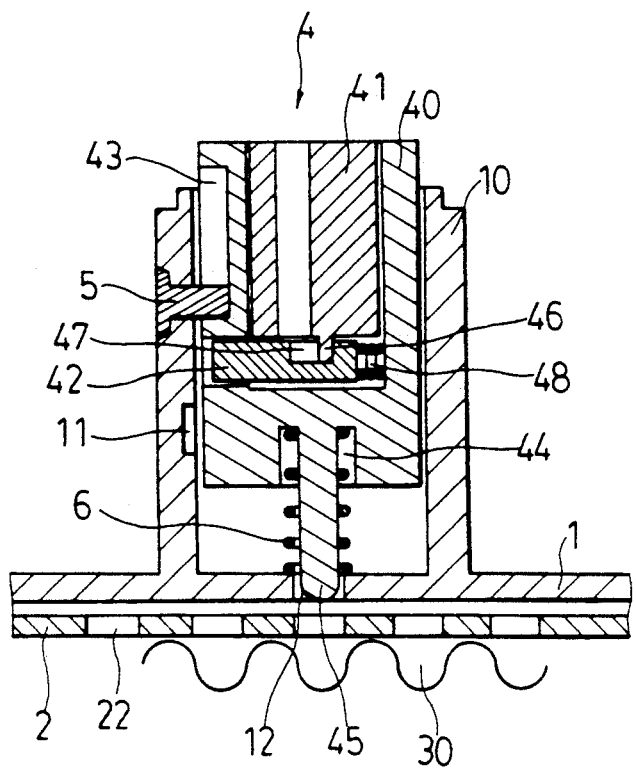
FIG. 5 is a sectional view showing unlocking state of the steering wheel lock according to the present invention.
Figure 6:
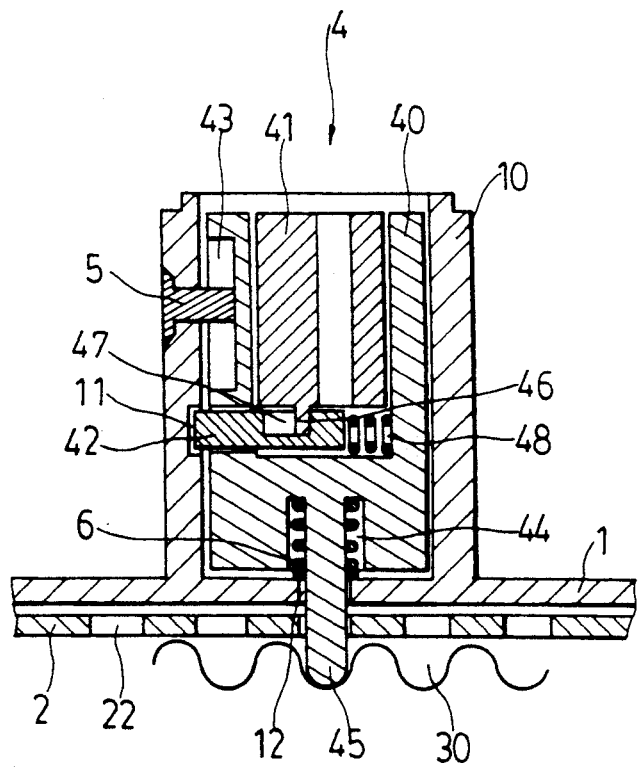
FIG. 6 is a sectional view showing the locking state of the steering wheel lock according to the present invention.
Figure 7:
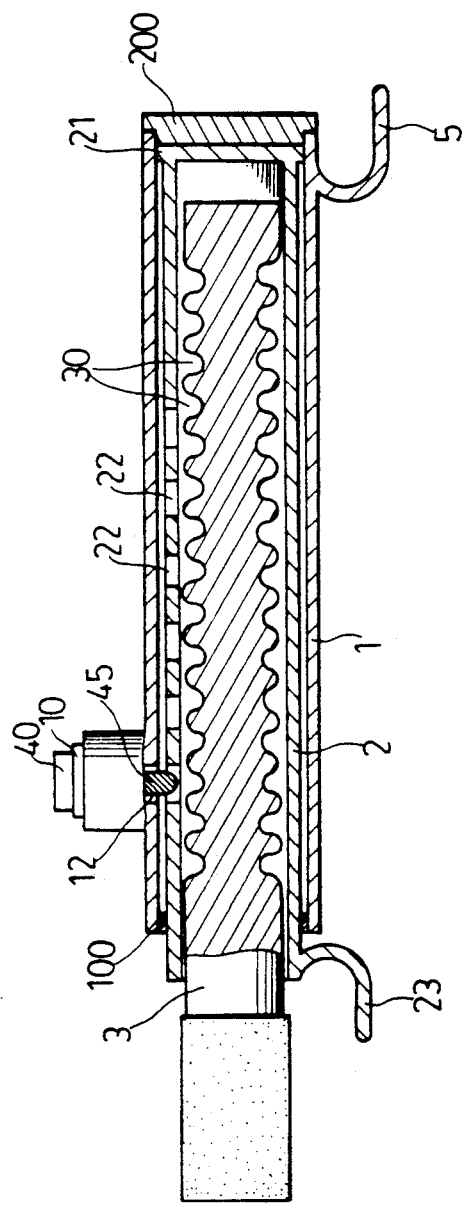
FIG. 7 is a sectional view showing the unlocking state of the steering wheel lock according to the present invention.
Figure 8:
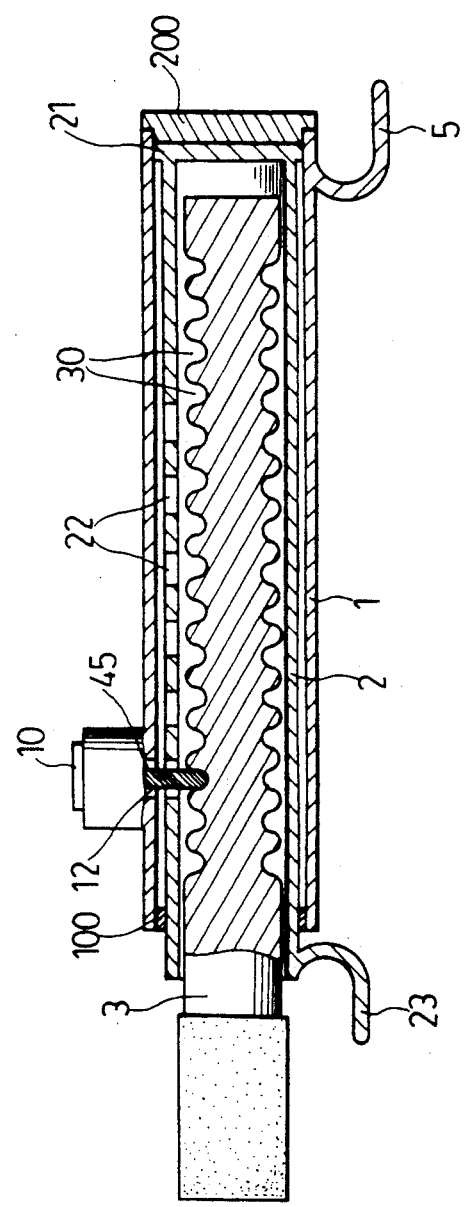
FIG. 8 is a sectional view showing the locking state of the steering wheel lock according to the present invention.

With reference to the drawings and in particular to FIGS. 3 and 4, the steering wheel lock according to the present invention mainly comprises a square tubular member 1 on which there is a seat 10 for receiving a lock core 4. The seat 10 is formed with a seat groove 11 and a hole 12 in its inner side (see FIGS. 5 and 6). A square frame 100 is engaged with one end of the square tubular member 1.

A movable cylinder 2 is inserted into the square tubular member 1 and provided at one end with a square plate 21 adapted to the square tubular member 1 and on the top with a plurality of equidistant holes 22. The other end of the movable cylinder 2 is supported by the square frame 100 so that the movable tube 2 may be moved along the square tubular member 1 steadily (see FIG. 4).

A square panel 200 is engaged with the other end of the square tubular member 1 for preventing the movable tube 2 from going out thereof.

A rod member 3 is slidably inserted into the movable cylinder 2 and has a plurality of annular grooves 30 engageable with the lock core 4.

The lock core 4 is composed of a central block 40, a rotatable member 41, an engaging pin 42, a fixing pin 5, and a spring 6. The central block 40 is provided with a central block groove 43 and has a hole for receiving the engaging pin 42. Further, the central block 40 has a recess 44 on the bottom for receiving the spring 6. At the center of the recess 44 there is a projection 45 extending through the spring 6. The bottom of the rotatable member 41 has a protuberance 46 just adapted to be received in an engaging pin groove 47 of the engaging pin 42 so that the engaging pin 42 is controlled by the rotatable member 41 and urged by a spring 48 to engage with the seat groove 11 of the seat 10. The fixing pin 5 extends through the seat 10 into the groove 43 of the central block 40 so as to prevent the central block 40 from detaching therefrom.

In assembly, the spring 6 is first disposed within the recess 44 so that the spring 6 encloses the projection 45. Then, use a correct key to push the rotatable member 41 to drive the engaging pin 42 to compress a second spring 48 and place the lock core 4 into the seat 10 so that the engaging pin 42 engages with the seat groove 11, the spring 6 bears against the inner bottom side of the lock core 10, and the projection 45 engages with the hole 12. Finally, the fixing pin 5 extends through the seat 10 into the groove 43 of the lock core 40 thereby preventing the lock core 40 from separating from the seat 10.

Further, the square tubular member 1 and the movable cylinder 6 are provided with hooks 5 and 23 respectively for engaging with the steering wheel. When in use (see FIGS. 5, 6, 7 and 8), first use a correct key to insert into the lock core 40 and to turn the rotatable member 41 so as to force the protuberance 46 to push the engaging pin 42 through the groove 47 against the second spring 48. The rotatable member 41 is further provided with other component parts such as pin, spring which are well known in the art and need not be described here in detail. Then, press the lock core 40 to compress the spring 6 so that the projection 45 goes into the hole 12 and a hole 22 of the movable cylinder 2 and engages with an annular groove 30 of the rod member. Meanwhile the engaging pin 42 goes into the seat groove 11 of the seat 10 thus keeping the steering wheel in a fixed position.

When desired to open the lock, simply insert a correct key to drive the engaging pin 42 away from the groove 11 so that the spring 6 pushes the projection 45 upwardly through the hole 12 thereby disengaging the annular groove 30 of the rod member 3 from the projection 45 and therefore, opening the lock.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:
1. A steering wheel lock comprising:
   a square tubular member having a seat formed with a seat groove and a hole in an inner side;
   a movable cylinder slidably inserted into said square tubular member and having a plurality of holes, said square tubular member being engaged with a square panel at one end and provided with a square member at the other end, said movable cylinder being provided with a square plate at an end, said square plate preventing said movable cylinder from detaching from said square tubular member;
   a rod member slidably inserted into said movable cylinder and having a plurality of annular grooves; and
   a lock core including a central block, a rotatable member, an engaging pin, a fixing pin, and a spring, said central block being provided with a groove and a hole for receiving said engaging pin and a recess on a bottom for receiving said spring, said recess having a projection extending through said spring, said rotatable member being provided at a bottom with a protuberance just adapted to be received in an engaging pin groove of said engaging pin so that said engaging pin is controlled by said rotatable member and urged by a spring to engage with the seat groove of said seat, said fixing pin extending through said seat into the groove of said central block so as to prevent said central block from detaching therefrom.

* * * * *